(12) United States Patent
Benson et al.

(10) Patent No.: US 6,888,537 B2
(45) Date of Patent: May 3, 2005

(54) CONFIGURABLE INDUSTRIAL INPUT DEVICES THAT USE ELECTRICALLY CONDUCTIVE ELASTOMER

(75) Inventors: Daniel Conrad Benson, Berkeley, CA (US); Irving S. Scher, Berkeley, CA (US)

(73) Assignee: Siemens Technology-To-Business Center, LLC, Berkeley, CA (US)

(*) Notice: Subject to any disclaimer, the term of this patent is extended or adjusted under 35 U.S.C. 154(b) by 287 days.

(21) Appl. No.: 10/075,075

(22) Filed: Feb. 13, 2002

(65) Prior Publication Data

US 2003/0151589 A1 Aug. 14, 2003

(51) Int. Cl.[7] ............................................. G09G 5/00
(52) U.S. Cl. ..................... 345/173; 345/168; 345/179; 345/156
(58) Field of Search ................. 345/156, 159, 345/162, 168, 172–174, 733, 734, 751, 179, 753, 156.4; 178/18.06; 463/38; 379/75; 318/109

(56) References Cited

U.S. PATENT DOCUMENTS

| | | |
|---|---|---|
| 720,602 A | 2/1903 | Müller |
| 3,959,585 A | 5/1976 | Mattes et al. |
| 4,121,049 A | 10/1978 | Roeber |
| 4,322,983 A | 4/1982 | Sado |
| 4,455,450 A | 6/1984 | Margolin |
| 4,484,026 A | 11/1984 | Thornburg |
| 4,492,949 A | 1/1985 | Peterson et al. ............ 338/114 |
| 4,517,546 A | 5/1985 | Kakuhashi et al. |
| 4,575,580 A | 3/1986 | Jandrell ........................ 178/18 |
| 4,677,258 A | 6/1987 | Kawashima et al. |
| 4,680,430 A | 7/1987 | Yoshikawa et al. |
| 4,687,885 A | 8/1987 | Talmage, Jr. et al. ......... 178/18 |
| 4,755,808 A | 7/1988 | Bullock et al. |

(Continued)

FOREIGN PATENT DOCUMENTS

| | | |
|---|---|---|
| DE | 19642615 A1 | 4/1997 |
| DE | 19647876 A1 | 4/1997 |
| DE | 200 14 172 U 1 | 1/2001 |
| DE | 101 40 000 A 1 | 3/2002 |
| EP | 0 175 176 | 8/1985 |
| EP | 0338857 | 10/1989 |
| EP | 0225008 | 12/1990 |
| EP | 0 816 989 A | 1/1998 |
| EP | 1 100 044 A1 | 5/2001 |
| GB | 2 222 258 A | 2/1990 |
| GB | 2350431 A | 11/2000 |
| JP | S55-32542 | 3/1980 |
| JP | 56004885 | 1/1981 |
| JP | 58017331 | 2/1983 |
| JP | 61195324 | 8/1986 |
| WO | WO 91/03783 | 3/1991 |
| WO | WO 01/61633 A2 | 8/2001 |

OTHER PUBLICATIONS

Material Saefty Data Sheet, Zotefoams plc, MSDS–15 EV CN Grades.
Prof. Heinz Wellhausen, Tastsensor mit Fingerspitzengefuhl, 2087 Elektronik 40 May 14, 1991 Munich Germany (with English Translation).

*Primary Examiner*—Vijay Shankar
*Assistant Examiner*—Prabodh M Dharia

(57) ABSTRACT

A configurable operator panel that uses a tactile sensor with electrically conductive elastomer and appropriate electronics is disclosed herein. The device relies on a robust and inexpensive tactile sensor that senses the touch position (and may or may not sense touch pressure as well). The physical interface is easily configurable along with the electronics, which execute the desired function based on touch location and pressure. The configurable operator panel is designed to communicate with most industrial automation equipment, including but not limited to, motion control equipment, programmable logic controllers (PLC), personal computers, and can be made to control other types of machines requiring external analog or digital input.

31 Claims, 12 Drawing Sheets

U.S. PATENT DOCUMENTS

| | | | |
|---|---|---|---|
| 4,818,048 A * | 4/1989 | Moss ............................ 345/7 |
| 4,826,552 A | 5/1989 | Breitscheidel et al. ...... 156/221 |
| 4,914,624 A | 4/1990 | Dunthorn |
| 4,955,051 A * | 9/1990 | Sato ............................ 379/75 |
| 5,060,527 A | 10/1991 | Burgess |
| 5,274,362 A | 12/1993 | Potvin |
| 5,311,779 A | 5/1994 | Teruo |
| 5,365,461 A | 11/1994 | Stein et al. |
| 5,367,130 A | 11/1994 | Isono ........................... 178/18 |
| 5,543,588 A * | 8/1996 | Bisset et al. ............. 178/18.06 |
| 5,565,968 A | 10/1996 | Sawa et al. ................. 355/259 |
| 5,572,728 A | 11/1996 | Tada et al. .................. 395/616 |
| 5,625,833 A | 4/1997 | Levine et al. ............... 395/800 |
| 5,701,141 A | 12/1997 | Schmenk et al. |
| 5,790,114 A | 8/1998 | Geaghan et al. ............ 345/326 |
| 5,808,540 A | 9/1998 | Wheeler et al. ............ 338/114 |
| 5,838,309 A | 11/1998 | Robsky et al. |
| 5,977,867 A | 11/1999 | Blouin |
| 5,995,026 A | 11/1999 | Sellers |
| 5,995,083 A | 11/1999 | Sato et al. |
| 6,005,496 A | 12/1999 | Hargreaves et al. |
| 6,072,130 A | 6/2000 | Burgess |
| 6,114,645 A | 9/2000 | Burgess |
| 6,121,960 A | 9/2000 | Carroll et al. ............... 345/173 |
| 6,239,790 B1 | 5/2001 | Martinelli et al. .......... 345/174 |
| 6,253,121 B1 * | 6/2001 | Cline et al. ................. 700/300 |
| 6,323,846 B1 | 11/2001 | Westerman et al. ......... 345/173 |
| 6,369,803 B2 * | 4/2002 | Brisebois et al. ........... 345/173 |
| 6,394,906 B1 * | 5/2002 | Ogata .......................... 463/38 |
| 6,501,463 B1 * | 12/2002 | Dahley et al. ............... 345/173 |
| 6,822,635 B2 * | 11/2004 | Shahoian et al. ........... 345/156 |
| 2001/0003041 A1 | 6/2001 | Redford et al. |
| 2001/0054647 A1 | 12/2001 | Keronen et al. |
| 2004/0090195 A1 * | 5/2004 | Motsenbocker ............. 318/109 |

* cited by examiner

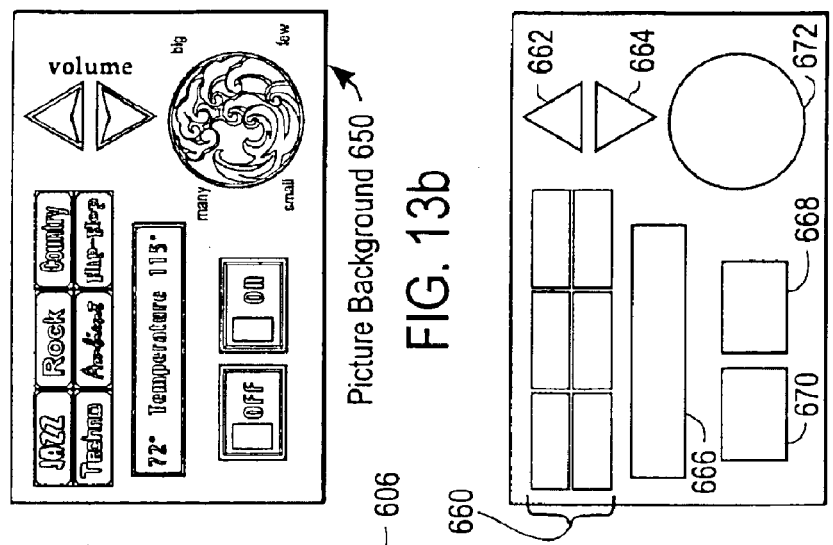
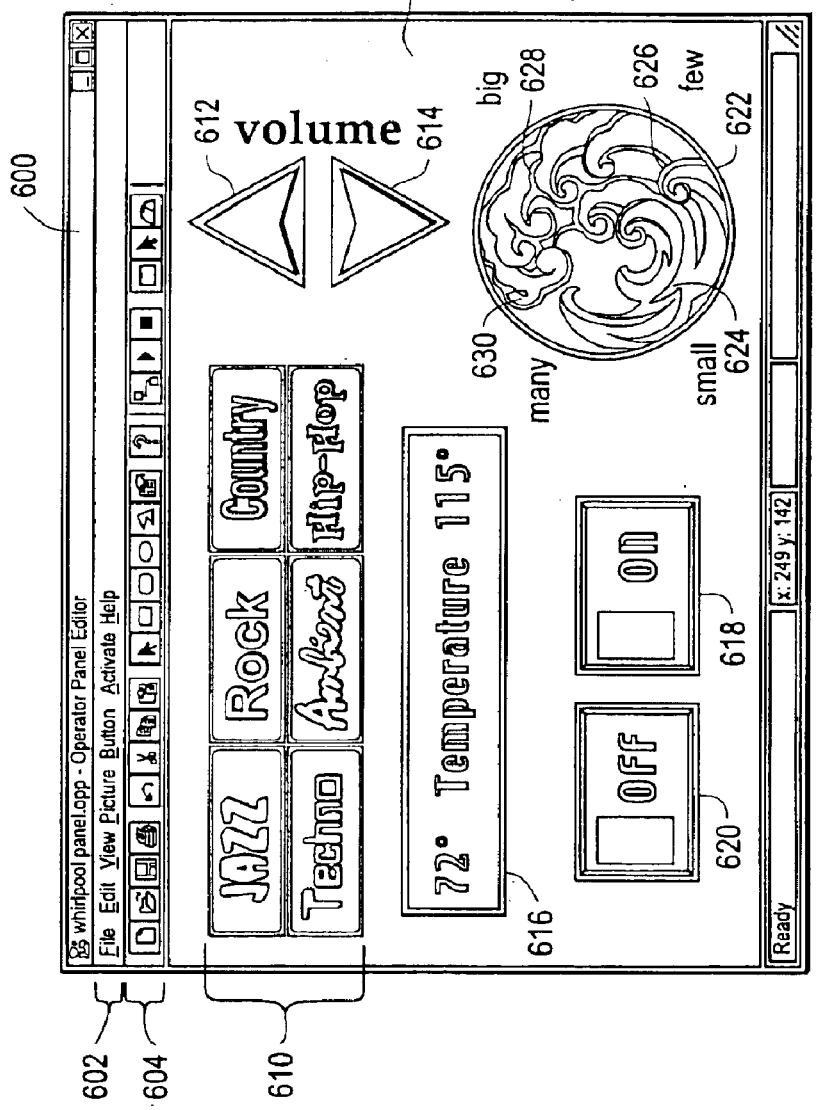
FIG. 13b
FIG. 13c
FIG. 13a

CONFIGURABLE INDUSTRIAL INPUT DEVICES THAT USE ELECTRICALLY CONDUCTIVE ELASTOMER

BACKGROUND OF THE INVENTION

The present invention relates to configurable input devices for industrial automation and motion control equipment, and in particular operator panels for use in industrial environments. Operator panels are used as man-to-machine interfaces that are found typically with industrial automation equipment to control machine functions.

Industrial operator panels that are small and low-cost currently are available commercially in fixed button configurations, which use membrane foil buttons or short-stroke push keys. Both of the fixed button input technologies use applied force to buckle or elastically deform a component in order to produce an electrical connection between electrodes. These technologies are inexpensive, robust, resilient to harsh environments, and provide tactile and audio feedback to the user. These membrane buttons typically are low voltage on/off switches, and the push keys are typically used as plug-and-play switches.

For industrial operator panel use, the membrane buttons and individual short-stroke push keys are relatively inexpensive compared to other more sophisticated types of input devices for operator panels, but they have significant drawbacks. For example, membrane buttons can cost approximately $7 per sheet of 60 membrane buttons and push keys can cost about $2 per push key. For a typical operator panel, the short-stroke push keys are more expensive than membrane buttons. As the number of required keys increases for more sophisticated operator control panels, the cost can become unreasonable with short-stroke push keys. Membrane buttons, on the other hand, have other drawbacks. For instance, after repeated use, membrane buttons wear easily such that the convex foil loses its ability to spring back after repeated buckling, rendering the button useless. Also, membrane buttons do not always work well in low-pressure environments (e.g., buttons may stay depressed inadvertently).

These types of technologies, however, have a major limitation in that operator panels utilizing these technologies cannot be customized easily by end users who may have a need to change frequently the features and capabilities of the operator panel. That is, there is currently no easy method to add/remove buttons, change the button locations, change the button sizes or shapes, change the force required for button activation, or add custom graphics. At present, end users that desire customized operator panels have two solutions. The first solution requires the end user to redesign and retool machines that produce the panels discussed above. Typical retooling costs for the membrane button sheets are currently about $25,000 or more. Compared to the cost and effort to retool, the easier and less expensive second solution is using touch screens.

For applications that require unique button configurations or button configurations that need to change periodically, expensive touch screens are currently the only commercially available option. Unfortunately, touch screens provide flexibility only at a high cost with their lack of durability and robustness. Industrial touch screens are fully graphic, touch sensitive LCD displays that facilitate operator control and process monitoring on the same screen. Touch screens do not use physical keys, but rather virtual buttons that are displayed on the screen. The touch screen senses pressures at the locations of the virtual button. Since buttons and controls are created in software, the location, shape, and function of the virtual buttons can be programmed to change as often as necessary. The configuration of the virtual buttons is stored usually on a computer (PC or PLC) that is inside the touch screen housing or connects to the touch screen via cabling. The computer must include the electronics and particular video drivers to display properly the virtual buttons on the LCD. Touch screens are, however, delicate when compared to other input devices and may have difficulty withstanding the harsh treatment or environments found in industrial automation. For example, touch screens do not absorb well any strong impacts or concentrated loads and touching a virtual button with, for example, a screwdriver tip can damage seriously the sensor or scratch significantly the outer surface of the touch screen. Touch screens also may not be able to withstand inputs exceeding a certain level of pressure. The corrosiveness of some environments may not allow the computer and its touch screen to endure for the long periods of time needed to justify their initial expense and costs of their eventual replacement.

Touch screens are expensive when compared to off-the-shelf membrane buttons or push-keys. If an operator panel placed in a harsh environment needs to be reconfigured frequently, a touch screen would be the only option despite its physical vulnerabilities.

Other configurable input devices without vulnerable displays exist currently, but they are not used in industrial automation and are intended for home or office computer input. Two examples of typical input devices include programmable keyboards and digitizing tablets.

Programmable keyboards typically are standard push key computer keyboards that may include extra push keys. The design of the push keys is similar to (but considerably less durable than) the short-stroke push keys found on industrial operator panels. In general, these keyboards have the ability to program a plurality of keys to respond with a series of standard ACSII symbols. The key information may be stored in non-volatile memory in the keyboard or in computer memory. Limitations in sealing and durability are the main deterrents to using these types of keyboards in an industrial setting. Additionally, these keyboards have the same problems as industrial short-stroke push key panels and membrane button panels: the keys are fixed in position, cannot change size, have a predetermined, constant activation force, and cannot easily accept custom graphics.

Some digitizing tablets allow users to define areas of the tablet as virtual buttons when used with specific computer aided design (CAD) software. For example, CadPRO by GTCO CalComp, Inc. ships with software that can be used with AutoCAD 2000® (AutoDesk, Inc). Virtual button information is configured and stored on a personal computer. Several devices provide a sleeve for the user to place a printed copy of the virtual button layout. When the user places a special pointing device on an area of the digitizing tablet that corresponds to a virtual button and presses a particular button (or the pointing device or computer keyboard), the CAD software is instructed to perform the virtual button function. All of the digitizing tablets require a personal computer to operate, need to be used with a special pointing devices such as special optical pens etc., and are not designed to be used in caustic environments. Additionally, these CAD digitizing tablets can be expensive and are typically used for engineering design applications in offices, rather than in industrial settings that have harsh environmental conditions.

Accordingly, there is a need for an alternative type of operator panel that is configurable, durable, and inexpensive operator panel and capable of being used in sophisticated industrial automation and motion control environments. As seen from the above, the current choices are between low-cost, non-customizable industrial operator panels and expensive, high-end touch screens.

SUMMARY OF THE INVENTION

The present invention provides an easy-to-manufacture, self-contained operator panel that is inexpensive, easily and fully customizable, and durable enough to be used in industrial automation, or other harsh environments for dynamic control.

According to a specific embodiment, the present invention provides a control panel apparatus having reconfigurable input buttons. The apparatus includes a tactile sensor, a plurality of input buttons reconfigurable by a user, and electronics coupled to the tactile sensor for measuring a location of a touch to an input button and an existence of and a level of pressure of the touch and for storing a plurality of functions. A representation of the plurality of input buttons is placed on the tactile sensor. Each of the plurality of functions is associated with a corresponding one of the plurality of input buttons. The touch on one of the plurality of input buttons causes the electronics to measure the location and the level of pressure of the touch and the touch causes an occurrence of one of the plurality of functions associated with the location and the level of the pressure of the touch.

According to another specific embodiment, the present invention provides a method of configuring an operating control device having a foam tactile sensor. The method includes the steps of defining an input button and a location of the input button corresponding to a portion of the tactile sensor, defining a first function of the input button. The first function is associated with an existence of, a first defined level of pressure of, and a location of a touch on the tactile sensor. The method also includes the step of defining a second function of the input button. The second function is associated with an existence of, a second defined level of pressure of, and the location of a touch on the tactile sensor.

According to another embodiment, the invention provides a system for controlling devices in an industrial or harsh environment. The system includes an operating control panel and an external device coupled to the control panel. The operating control panel includes a foam tactile sensor, a representation of input buttons on the foam tactile sensor, and electronics. The electronics are capable of measuring a pressure level and a location from a touch on the representation of input buttons on the foam tactile sensor, processing the pressure level and the location, and outputting a signal that causes a function associated with the pressure level and the location. The external device receives the signal and performs the function.

These embodiments and others are more easily understood in conjunction with the following detailed description and drawings.

BRIEF DESCRIPTION OF THE DRAWINGS

FIG. 1b illustrates an orthogonal, exploded view of the operator panel of FIG. 1a;

FIG. 2b illustrates an orthogonal, exploded view of the operator panel similar to the specific embodiment of FIG. 2a;

FIG. 13a shows an example of the graphical user interface of the Panel Editor tool, according to a specific embodiment of the present invention;

FIG. 13b shows an example of the picture background representation of the operator panel buttons as configured by the user using the Panel Editor tool, according to the specific embodiment of FIG. 13a;

FIG. 13c shows an example of the button regions of the tactile sensor of the operating panel that corresponds to the picture background representation of the operator panel buttons configured by the user using the Panel Editor tool, according to the specific embodiment of FIG. 13a and FIG. 13b.

DETAILED DESCRIPTION OF THE SPECIFIC EMBODIMENTS

Figure 1A:
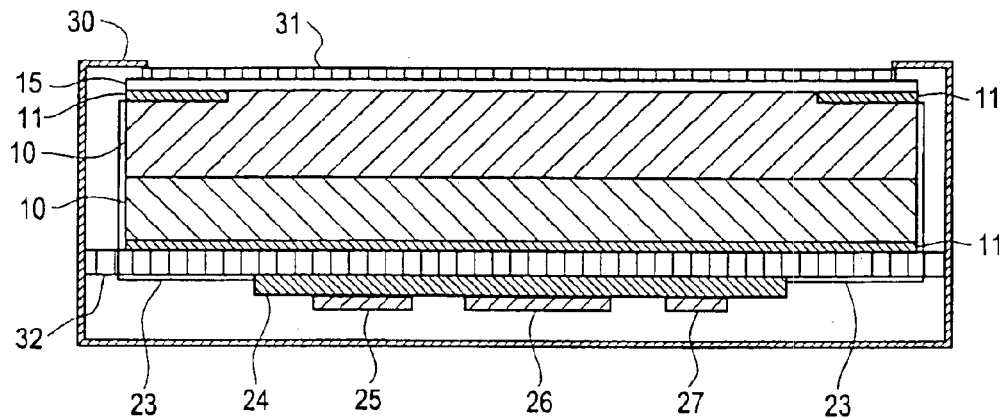
FIG. 1a illustrates a cross-sectional view of a configurable operator panel having a tactile sensor with two layers of electrically conductive elastomers, according to a specific embodiment of the present invention.

A configurable operator panel that uses a tactile sensor with electrically conductive elastomer and appropriate electronics is disclosed herein. The device relies on a robust and inexpensive tactile sensor that senses the touch position (and may or may not sense touch pressure as well). The physical interface is easily configurable along with the electronics, which execute the desired function based on touch location and pressure. The configurable operator panel is designed to communicate with most industrial automation equipment, including but not limited to, motion control equipment, programmable logic controllers (PLC), personal computers, and can be made to control other types of machines requiring external analog or digital input.

The input device of the present invention includes a tactile elastomer sensor for touch input from the user, electronics for sensor measurements, for storing the configuration of the virtual buttons and for communications, and software for controlling the electronics and for configuring the virtual buttons of the input device. The touch sensor provides a durable and inexpensive touch surface that can also measure pressure in addition to touch location. The input device is configured (and can be reconfigured as often as desired) in software that runs on a personal computer (PC), or other computing device. The buttons of the input device and their respective functions, as configured, may be provided through any design or image used as a background or template for the virtual buttons of the input device. The design (or image) of the virtual buttons may be printed and inserted into the tactile sensor to indicate to the user the locations of the virtual buttons on the tactile sensor surface. With the present invention, the size, placement, type and functions of the virtual buttons are first configured using the software on the PC then transferred to the electronics within input device. Accordingly, the input device does not need to remain connected to the PC or PLC in order to operate. Once configured (or reconfigured), the analog and digital outputs of the input device are connected to industrial automation and motion control equipment and the input device can be used to control the equipment as desired by the user.

For the purposes of this disclosure, elastomers are defined as those materials that can be deformed elastically by 10% or more from their initial size. Elastomers are typically composed of blended polymers that contain thermoplastics and/or thermosetting plastics. Examples include, but are not limited to, polyvinyl chloride, polystyrene, polycarbonate, nylon, polyurethane, polyethylene, polypropylene, natural rubber, and Cis-polyisoprene. An electrically conductive elastomer is defined as an elastomer that is or can be made to be electrically conductive (500Ω or less per cm). Elastomers that change their electrical resistance with applied force (called "piezoresistive" materials) to 500Ω or less per cm will also be considered electrically conductive elastomers. Electrically conductive elastomers can be intrinsically conductive by adding conductive particles (such as carbon, silver, nickel, gold, etc.) to an elastomer during its formation. Alternatively, coating cellular structured non-conductive elastomers with a conductive liquid or powder can produce electrically conductive elastomers-these materials are typically electrically conductive open-cell foams. Thus, the term "elastomer" used in this patent will henceforth refer specifically to electrically conductive elastomers.

Conductive foams are now being made out of more inert (chemically and environmentally) materials such as polyethylene and polypropylene by doping the polymer with carbon or other impurities that are conductive. One example of intrinsically electrically conductive foam is Evazote® by Zotefoams, Inc. In this foam, the polyethylene becomes electrically conductive by adding carbon to the polymer during formation. These materials are much more difficult to bond to than conventional elastomers. The resistance between the electrodes and the foam elastomer is measured to find the pressure and the location of the touch on the tactile sensor.

Using conductive foam elastomers in preferred operator panel embodiments of the invention is advantageous in that the measurement of both touch pressure and location can be obtained. In some situations where users may not need or want the ability to measure and use touch pressure, the tactile sensor may take different forms rather than being foam elastomer. One example includes the use of the touch sensors incorporated into most touch screens. The main components are two sheets of polymer (typically high-density polyethylene or polyester) with a conductive coating on one side. The sides of the polymer sheets with conductive coating face each other and are separated by a small gap; small non-conductive ridges, edge forces, or elastic members enforce the constraint. A small voltage difference is applied across one set of electrodes. When the screen is touched, the two sheets contact and the position is measured using the second set of electrodes. For touch screens to work properly, no foreign material or liquid may enter the gap between the conductive sheets—sealing is very important. As discussed above, these touch screen panels are relatively delicate when compared to the membrane buttons or push keys; since they are bonded usually to a thin sheet of non-tempered glass (a weak point in the system), these sensors do not absorb well impacts. Additionally, these sensors cannot detect multiple touches.

Therefore, tactile sensors using conductive foam elastomer are preferred for their durability, low cost, resilience to impacts, and performance even in caustic environments. These foam elastomers are also easy to manufacture, further reducing costs. The tactile sensor used in preferred embodiments of the present invention has single or multiple layers of electrically conductive elastomer 10, as discussed below.

Figure 1B:
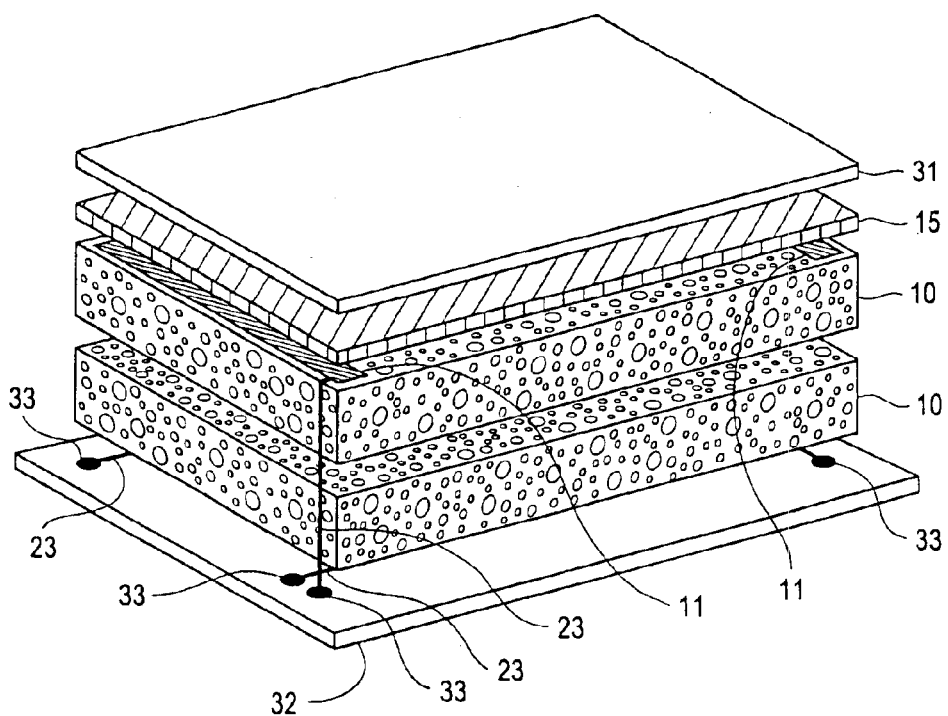

Referring to FIG. 1a, the configurable operator panel hardware according to a specific embodiment of the present invention is shown. FIG. 1b shows an exploded orthogonal view of the configurable operator panel hardware of FIG. 1a, which shows a cross-sectional view. FIG. 1b does not show the panel's housing for simplicity. The operator panel includes a tactile sensor (composed of two layers of foam elastomer 10 and electrodes 11 disposed on parallel edges of each elastomer layer, with electrodes on one elastomer layer disposed perpendicularly with respect to the electrodes on the other elastomer in an X–Y arrangement); a printout 15 of the virtual buttons; conductors 23 connected to electrodes 11; printed circuit board 24 with measurement electronics 25, microcontroller 26 and communications circuitry 27 thereon; panel housing 30; protective outer surface 31; base 32; and vias 33 in the base for input/output connections. All of these hardware components are chosen to be very inexpensive, durable, and work well in a wide range of operating conditions.

Figure 2A:
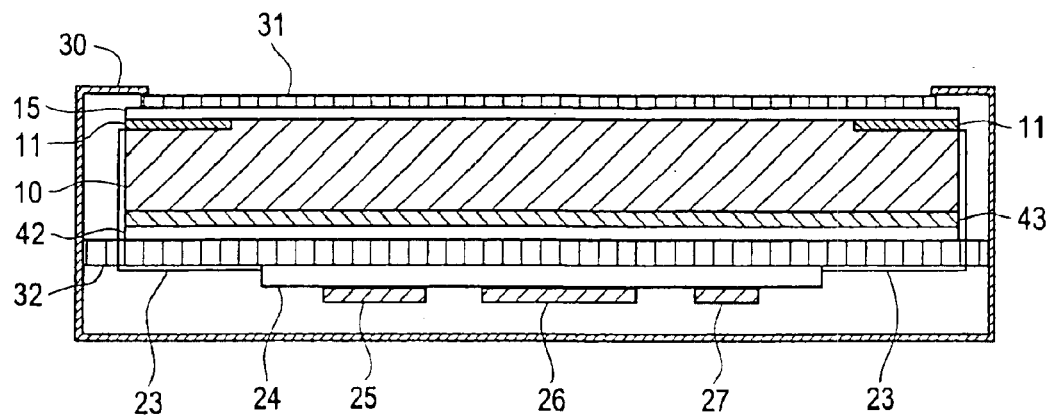
FIG. 2a illustrates a cross-sectional view of a configurable operator panel having a tactile sensor with one layer of electrically conductive elastomer, according to another specific embodiment of the present invention.

FIG. 2a shows a cross-sectional view of a configurable operator panel hardware according to another specific embodiment of the present invention. This operator panel includes a tactile sensor (composed of one layer of foam elastomer 10 and electrodes 11 disposed on parallel edges of one side of the elastomer layer); a printout 15 of the virtual buttons, conductors 23 connected to electrodes 11; printed circuit board 24 with measurement electronics 25, microcontroller 26, and communications circuitry 27 thereon; panel housing 30; protective outer surface 31; base 32; touch sensor printed circuit board 42 with electrode combs 43 thereon disposed perpendicularly with respect to electrodes 11; and input/output connectors (not shown). In this tactile sensor, at least one electrode 11 is attached rigidly or firmly to elastomer layer 10 with the least possible contact resistance that does not fluctuate significantly over time.

Figure 2B:
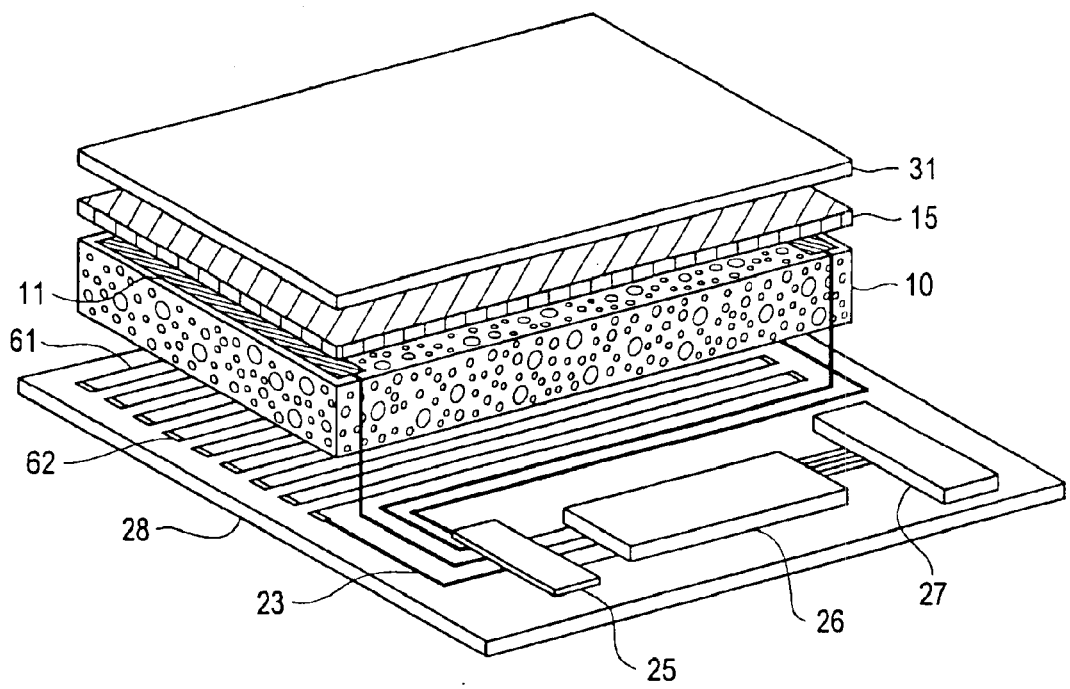

According to another specific embodiment, FIG. 2b shows an exploded orthogonal view of the configurable operator panel hardware similar to that in FIG. 2a. FIG. 2b does not show the panel's housing for simplicity. This operator panel includes a tactile sensor (composed of one layer of foam elastomer 10 and electrodes 11 disposed on parallel edges of one side of the elastomer layer) a printout 15 of the virtual buttons; conductors 23 connected to electrodes 11; printed circuit board 28 with measurement electronics 25, microcontroller 26, communications circuitry 27, electrode combs 61 and resistors 62 thereon; protective outer surface 31; and input/output connectors (not shown). In this tactile sensor, at least one electrode 11 is attached rigidly or firmly to elastomer layer 10 with the least possible contact resistance that does not fluctuate significantly over time.

According to various specific embodiments, the tactile sensor can be any two dimensional surface, including, but not limited to, flat rectangular sections, parts of an annulus, or a section of a cylinder. For simplicity, the rectangular tactile sensors are shown in the figures. There is only one restriction on shape: the shape of the sensor must allow for electrodes to be attached to each layer of electrically conductive elastomer such that the electrodes can produce unique lines of voltage across the elastomer surface.

Unlike other touch sensors, the elastomer sensors do not require a gap between the two layers of elastomer 10 in FIG. 1 (or between the elastomer 10 and the electrode comb 61 in FIG. 2). The contact resistance between the elastomer layers 10 in FIG. 1 (or between the elastomer 10 and electrode comb 61 in FIG. 2) varies with applied pressure and is used to measure position and magnitude of applied pressure. An example of a tactile sensor that would work well for the tactile sensor of the present invention is described in commonly owned pending U.S. patent application Ser. No. 09/504,207 (Attorney Docket No. 99P5844US01).

Figure 3:
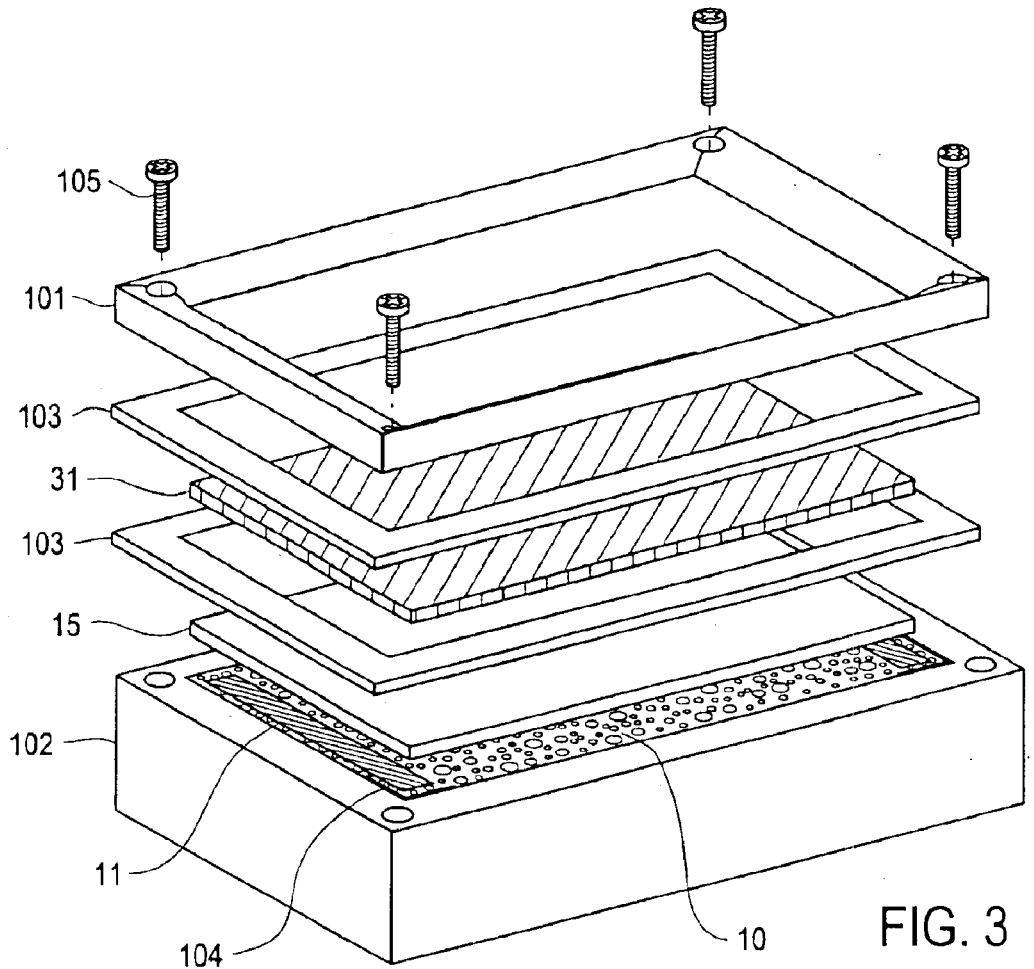
FIG. 3 illustrates an orthogonal, exploded view of the operator panel with a housing with a removable top, according to a specific embodiment of the invention.

The operator panel housing 30 is formed from polymer or metal, according to specific embodiments. One example embodiment of the housing, such as seen in FIG. 3, has two polymer pieces formed by injection molding. The panel housing top 101 is designed to seal tightly to the protective outer surface 31 and to the panel housing bottom 102 using one or more thin gaskets 103. Grooves or guides 104 in bottom 102 facilitate an easy fit of the printout 15 of the virtual buttons onto the tactile sensor. Bolts 105 that run through holes in the panel housing top 101 thread into the panel housing bottom 102 to provide the pressure required to provide a tight seal. Other clamping methods may be used and include, but are not limited to, spring loaded clamps, latches, and flexible members with locking shaped protuberances. For any embodiment, the sealing path is designed to be water tight, chemical resistant, and provide protection from high voltages and heat. The housing material, design, and manufacturing processes are chosen to be inexpensive and produce a tough housing.

The designs of the panel housing 30 include the components necessary to place easily and repeatedly the printed image of the virtual buttons 15 between the top protective layer 31 and the electrically conductive elastomer 10. Top protective layer 31 is chosen to be a transparent material that is chemically resilient and can flex significantly; one example is a thin sheet of polyester that has been etched chemically to have an anti-glare film.

In the example embodiment shown in FIG. 3, four bolts 105 need to be removed to remove housing top 101 to replace the printout 15 of the virtual buttons. Once the bolts are taken out, the panel housing top 101 and the protective top surface layer 31 can be detached temporarily from the panel housing bottom 102. The panel housing bottom 102 is designed to contain at least one corner 104 that can be used to align correctly the printout 15 of the virtual buttons with respect to the electrically conductive elastomer sheet(s) 10.

Figure 4:
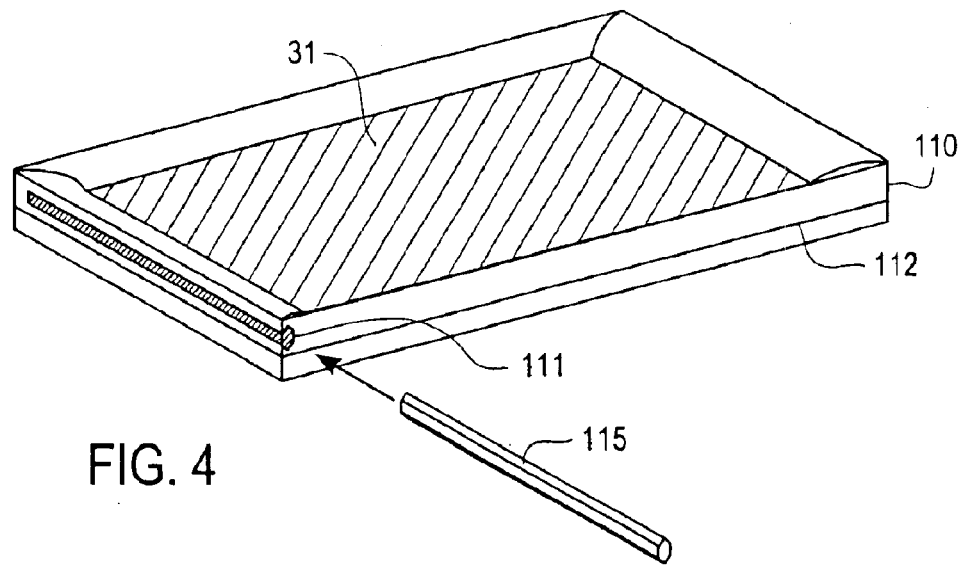
FIG. 4 illustrates an orthogonal view of the operator panel with a housing with an insert with a slideable door, according to another specific embodiment of the invention.

FIG. 4 illustrates another example embodiment with a one-piece panel housing body 110. In this embodiment, the operator panel is initially made of two or more pieces that are joined together at a seam 112. For example, polyethylene sections can be welded together with heat or ultrasonic welding, or two pieces of poly-vinyl chloride can be welded together using methyl-ethyl-ketone. A slot 111 is used to insert and remove the printout 15 of the virtual buttons (not shown in this figure). This slot 111 can be present in one of the initial panel housing elements or can be machined into the panel housing 110. A slot cover 115 is used to seal the slot 111. The slot cover 115 is designed to lock into the panel housing 110 and seal tightly after inserting the printout 15 of the virtual buttons. The slot cover 115 may be made of the same material as the panel housing 110 and may use a weak adhesive or sealant to hold it in place and seal tightly the panel.

Figure 5:
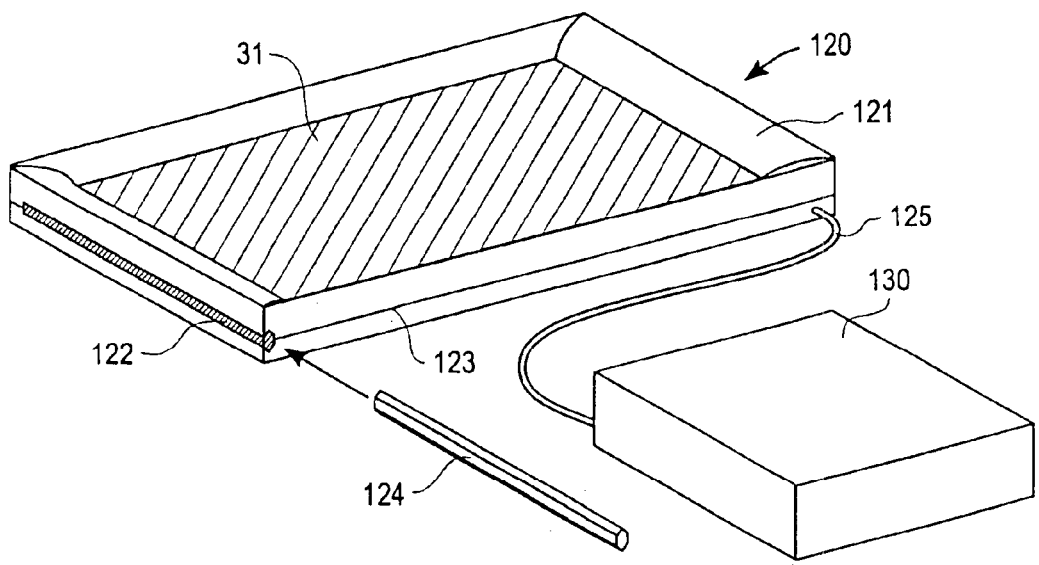
FIG. 5 illustrates an orthogonal view of the operator panel with a housing connected to an external container for the operator panel's electronics, according to another specific embodiment of the invention.

Electronics can be inside the housing itself or placed outside in a separate enclosure 130, as illustrated in the embodiment of FIG. 5. If a separate enclosure 130 is used, the enclosure design (and wiring 125 from the tactile sensor 120 to the enclosure 130) must be chosen to provide the same ruggedness and resilience as the panel housing 121 (described above).

The operator panel electronics are comprised of one or more integrated circuits (ICs) used for taking measurements, communications, and for storing and using virtual button information. In most embodiments, the total price of the ICs and manufacturing costs are lower when using fewer electronic components. When the desired resolution of the measurement electronics is relatively low (see details below) and the communications protocol is standard, the measurement electronics, microcontroller, and communications electronics are found sometimes on one integrated circuit. One example of ICs that can be used to reduce the quantity of ICs required (and therefore the cost) is the PIC family of microcontrollers from Microchip Technology Inc. Others skilled in the art of electronics design will know other families of integrated circuits that will provide the needed functions at a low cost.

The measurement electronics 25 use an analog-to-digital (A/D) converter to change high-level analog voltages (larger than 20 mV) from the electrodes 11 to digital signals that can be used by the other electronics. The A/D converter chosen for the device is determined by the smallest resolution desired. For example, if the desired resolution is 0.01 cm for a 10.0 cm×20.0 cm rectangular sensor, then there need to be at least 2000 discrete segments needed in each direction—the A/D converter chosen in this example needs to be accurate to at least 11-bits (2048 divisions). The least expensive A/D converter with the minimum number of bits required is chosen for the measurement IC.

An inexpensive microcontroller 26 is at the electronics core. The measurement electronics 25 connect to the microcontroller 26 that stores and uses the virtual button information. A program, as discussed below, in microcontroller 26 uses the data from the measurement electronics and stored virtual button information to generate signals for the communications electronics or to send directly signals to automation equipment. The microcontroller 26 should have the ability to store button parameters and functions in non-volatile memory.

The communications electronics 27 translate signals to and from the microcontroller into a protocol that can be used by industrial automation equipment. In the preferred embodiment of the present invention, the protocols may include, but are not limited to, PC serial communications, PC parallel, universal serial bus (USB), and ProfiBus. Connectors (not shown) used to connect the operator panel to external equipment should be designed to match the protocol used by the communications electronics (i.e., a USB connector for USB communications electronics).

The operator panel's microcontroller software manages the input from the measurement electronics to determine efficiently and produce quickly the desired operator panel output. This microcontroller program and the virtual button configuration data are stored in operator panel's non-volatile memory. The present invention may operate in two modes: an isolation mode in which the operator panel's generated signals (analog signals that may be amplified or otherwise filtered depending on the necessary control signals required by the controlled device) are sent directly to a controlled device; and a mode in which the operator panel operates as an input device to an external computing device, such as a PLC, and sends data signals (such as the button ID and other parameters including pressure level) to the external computing device.

The following description assumes that the microcontroller has both the A/D ports and communications hardware built-in, according to a specific embodiment.

Figure 6:
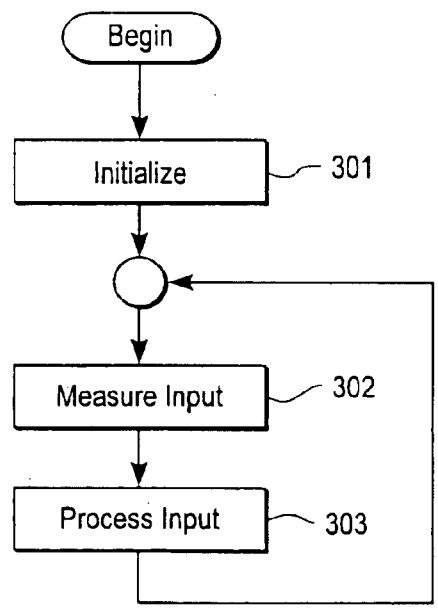
FIG. 6 is a flowchart illustrating the general operation of the microcontroller software of the operator panel according to a specific embodiment of the invention.

FIG. 6 is a flowchart illustrating the general operation of the microcontroller software of the operator panel according to a specific embodiment of the invention. As seen in FIG. 6, the microcontroller software (also called the "microcontroller program") performs two primary actions during the power-on cycle. The first action is the initialization process of step 301. The second action is an infinite loop that includes an operation to measure input from the operator panel's tactile sensor (step 302) followed by an operation to process the measured input from the operator panel's tactile sensor (step 303). This loop is continuous until the operator panel is reset or power is cycled.

Figure 7:
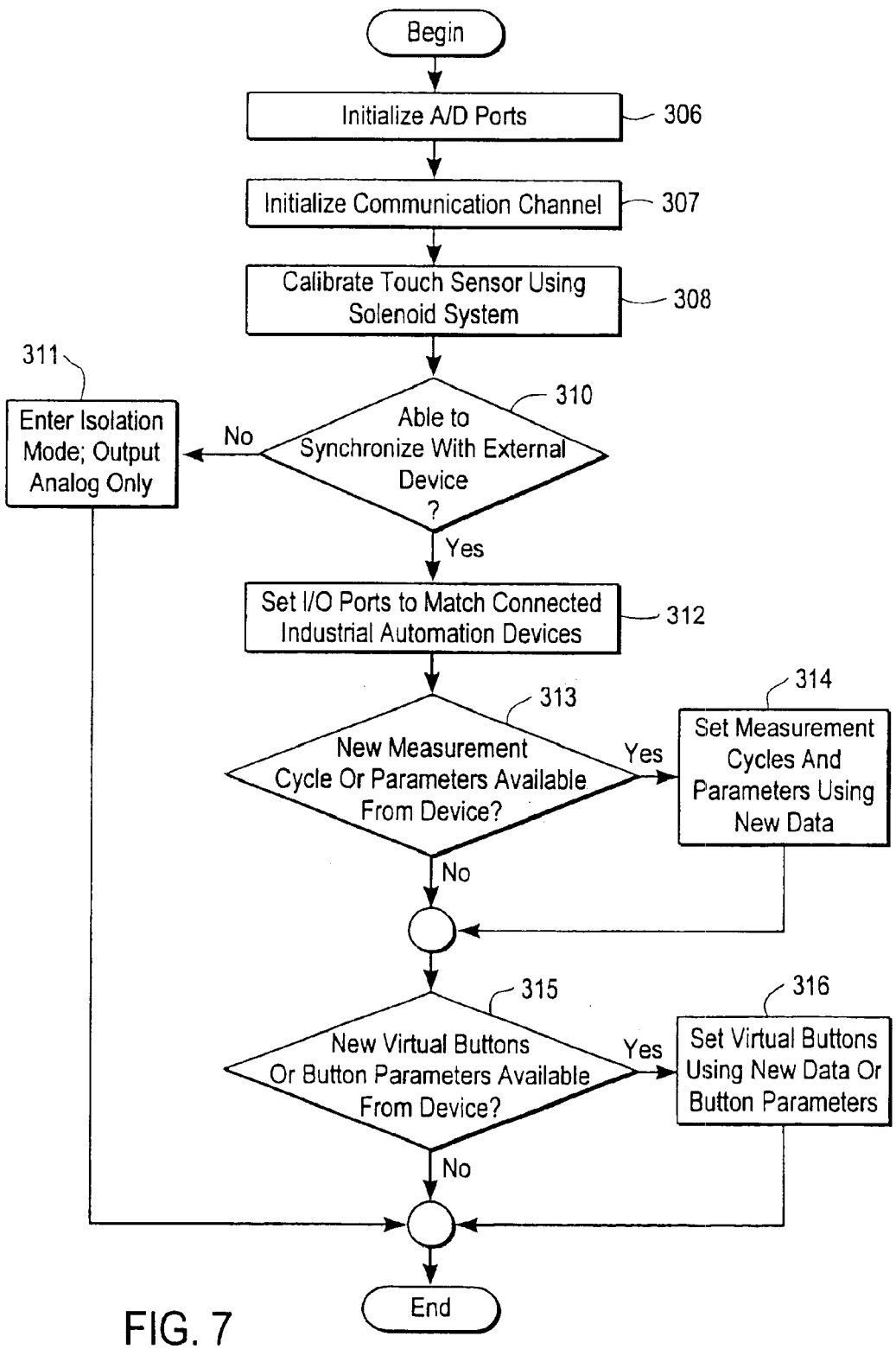
FIG. 7 provides a more detailed flowchart of the initialization process 301, according to a specific embodiment.

The initialization process of step 301 in FIG. 6 configures the microcontroller 26. In general, the first two routines of the initialization process 301 establish connections to the tactile sensor hardware and to the external industrial automation devices that are to be controlled by the operator panel. FIG. 7 provides a more detailed flowchart of the initialization process 301, according to a specific embodiment. Upon powering up the microcontroller, the initialization process 301 sets the microcontroller ports including any A/D ports in a step 306 and then initializes the communications channels in a step 307. As a precaution against changes in impedance in the tactile sensor or wiring, solenoids (which are built into the operator panel device at the corners of the elastomer foam layer(s) and mounted to press perpendicular to the foam surface in a preferred embodiment) are used to calibrate the four corners of the sensor in step 308. Additional methods for testing the sensor readings upon powering up will be known by those skilled in the art.

Then in step 310 the microcontroller program attempts to synchronize communications with a PC, PLC, or other industrial automation device that is connected to the operator panel. For example, if the operator panel were connected to a PC via a serial cable, the microcontroller program would attempt to start serial communications with the PC. If no industrial automation devices are detected and thus synchronization with external devices is not executed, the initialization process executes step 311. In step 311, the program sets the operator panel to work in "isolation mode" using only analog output lines through a standard connector and then ends the initialization process.

If at least one external device such as an industrial automation device is detected and synchronization occurs, the initialization process continues with step 312. In step 312, the communications ports on the microcontroller are optimized for sending and receiving information through multiple I/O connectors (each with a different communications protocol). For example, the microcontroller may use some output ports for serial communications with a PC and other output ports for communications with a motor controller using ProfiBus.

The microcontroller queries the devices in step 313 to determine whether or not new measurement cycles or measurement parameters are to be used (for use with the devices). If there exist new measurement properties, the new properties are downloaded and stored in non-volatile memory by the microcontroller in a step 314. For example, if the industrial automation device requires a measuring frequency higher than the current operator panel setting, then the microcontroller program will download the new measurement parameter (sampling frequency in this case) from the industrial automation device. At step 315, the program then queries the industrial automation device for any changes in the design or parameters of the virtual buttons of the operating panel. The industrial automation device may add, remove, or change any button parameters by sending new virtual button information to the microcontroller in a step 316. The parameters include, but are not limited to, button size, button shape, button location, force to activate the button, and button output response. Button information is stored by the microcontroller in non-volatile memory. At the end of step 316, the initial location of pressure and pressure magnitude are all set to 0 (not shown). Note that in the case there are no new button parameters, the microcontroller uses the existing button configuration already stored in non-volatile memory. This is also the case when operating in isolation mode.

Figure 8:
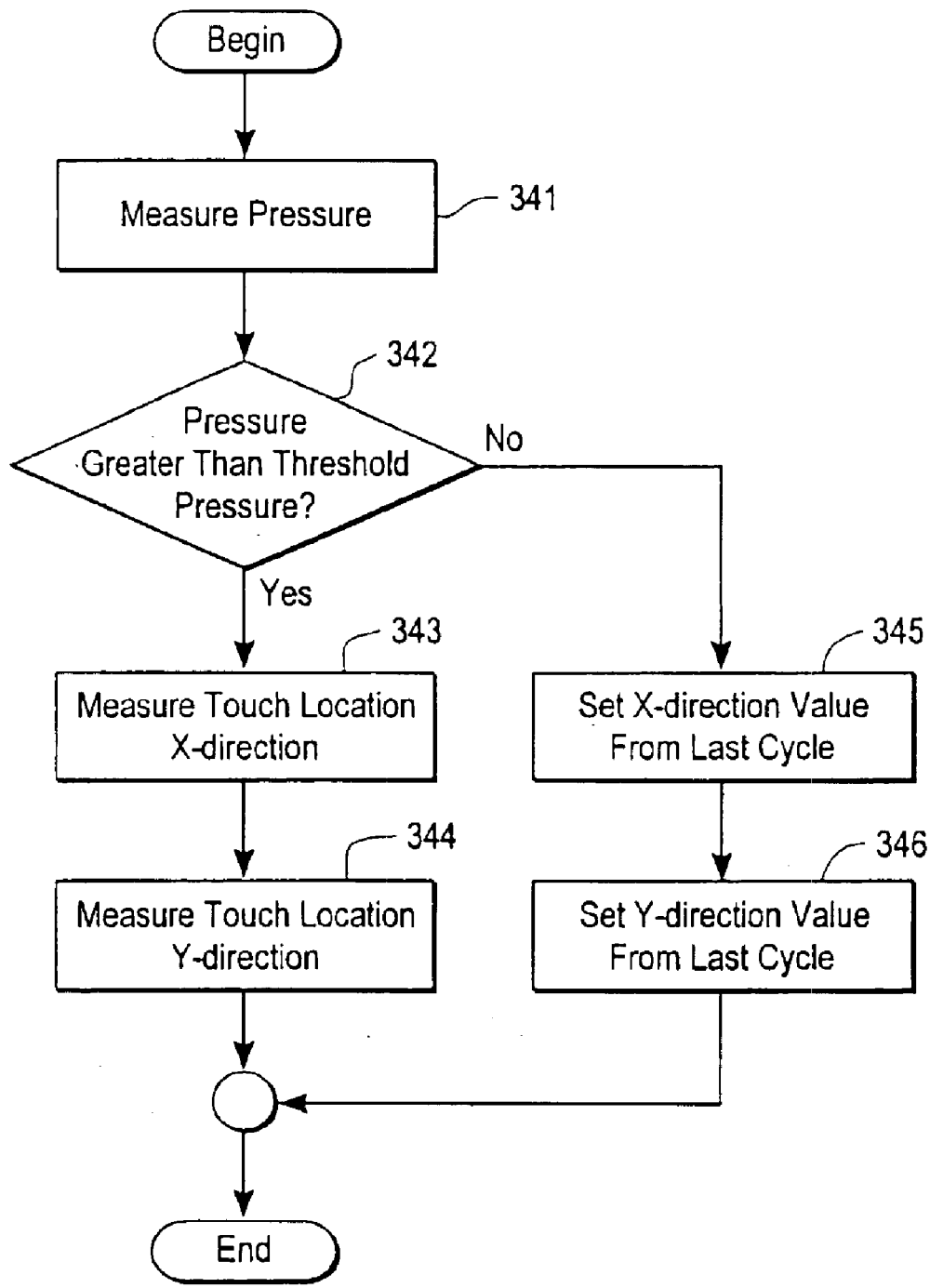
FIG. 8 is a more detailed flowchart of the measuring process 302, according to a specific embodiment.

Referring to FIG. 6, after initializing the operator panel in step 301, the microcontroller program measures input in step 302 and processes the measured data in step 303. The measurement step 302 is shown in more detail in FIG. 8. The microcontroller program starts by measuring the pressure of a touch on the tactile sensor of the operating panel in a step 341. If the measured pressure (also called "applied pressure" or "$P_{applied}$") from step 341 exceeds a predetermined threshold pressure (which is initially programmed into the microcontroller, but may be changed during initialization in step 314 of FIG. 7), then the location of pressure is measured in both the x-direction (step 343) and y-direction (step 344). If the measure pressure from step 341 is less than or equal to the threshold pressure, then the x-direction and y-direction location of pressure are set to the values from the last measurement cycle in steps 345 and 346.

As was seen from FIG. 6, the measurements made in step 302 are used to process the touch data in step 303. Initially, all buttons have an inactive (not currently touched) state. For each button, the button parameters (originally programmed into the microcontroller or downloaded in step 316 of FIG.

Figure 9:
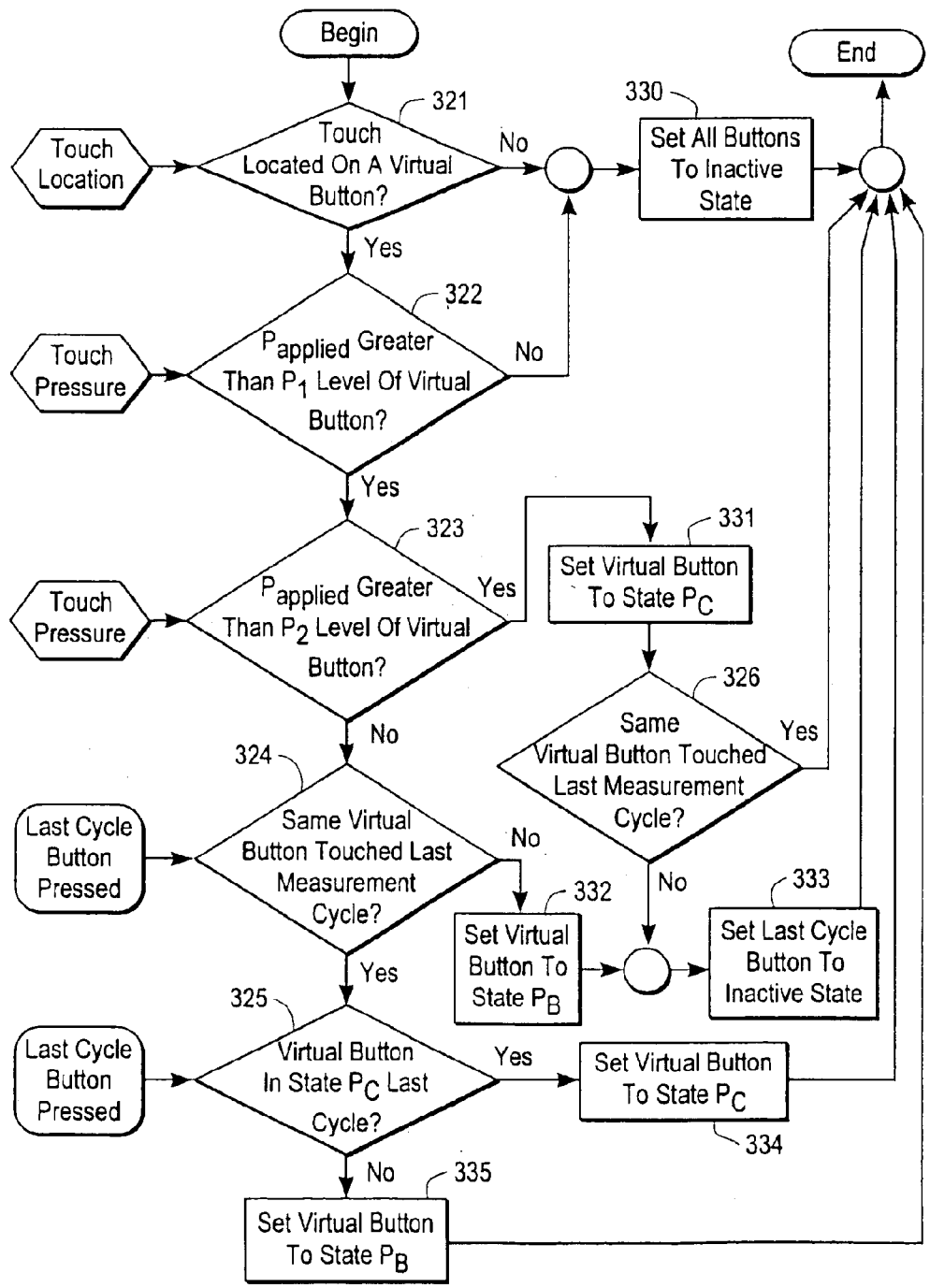
FIG. 9 is a flowchart illustrating the process of using the measurement data to control the states of a pressure-sensitive three-state button, where the button has an inactive state $P_A$ and two additional states, $P_B$ and $P_C$, in accordance with a specific embodiment of the present invention.

7) determine the pressure required to activate at least one additional state. According to a specific embodiment, FIG. 9 shows an example of an input process step 303 for a pressure-sensitive three-state button, where the button has an inactive state $P_A$ and two additional states, $P_B$ and $P_C$. For example, the inactive state may be configured to be "off" while first active state may be configured to be "on—setting 1" and the second active state may be configured to be "on at setting 2", where the settings are determinable depending on what type of industrial automation device is being controlled by the operator panel. The pressure required to activate states $P_B$ and $P_C$ of the button are $P_1$ and $P_2$, respectively, where $P_1$ is defined to be less than $P_2$.

As seen in FIG. 9, the process of using the measurement data to control the states of a three-state button is described. As mentioned above, this type of logic controls all virtual buttons with three states: one inactive and two active states. Once the measurements are made in step 302 (FIG. 6), the location of the pressure is compared to the button areas in step 321 to determine if the user touched the operating panel on a virtual button. If the user did not press onto a virtual button, the buttons are all set to inactive in step 330 and the measurement process 302 is repeated.

The next series of operations determines the button state and, if appropriate, how to handle the button that was pressed during the last cycle. Provided the user touched the panel on a virtual button, the program in step 322 compares the $P_{applied}$ to $P_1$ (the pressure required for the virtual button to be in state $P_B$). If $P_{applied}$ is less than or equal to $P_1$, the buttons are all set to inactive in step 330 and the measurement process 302 is repeated. Alternatively, if $P_{applied}$ is greater than $P_1$, then the program in step 323 compares the $P_{applied}$ to $P_2$ (the pressure required for the virtual button to be in state $P_C$). When $P_{applied}$ is greater than $P_1$ and also greater than $P_2$, the virtual button is set to state $P_C$ in step 331. The program in step 326 then determines if the virtual button was the same as the virtual button touched during the last cycle. When the virtual button is the same, then the process 303 ends. Otherwise, the button pressed in the last cycle is set to inactive in step 333 and then the process 303 ends.

If $P_{applied}$ is less than $P_2$ (but greater than $P_1$, which was determined in step 322), the program in step 324 determines if the virtual button touched currently is the same as the virtual button touched during the last cycle. If not, then program in step 332 sets the virtual button to state $P_B$ and then the program in step 333 sets the button touched in the last cycle to inactive.

In some embodiments, it may be important that a lower state not be activated after a virtual button is set to a higher state. As an example, virtual buttons controlled by the logic in FIG. 9 cannot enter state $P_B$ after the same button was in state $P_C$ during the previous cycle; process step 325 manages this logic. When the virtual button is the same as last cycle (as determined by step 324) and the virtual button was not in state $P_C$ during the last cycle (as determined by step 325), the program in step 335 sets the virtual button to state $P_B$. On the other hand, if the same virtual button is pressed and the virtual button was in state $P_C$ during the last cycle (as determined by step 325), then the virtual button is again set to state $P_C$ by process 334.

As part of the reconfigurable operator panel, the present invention includes an accompanying software tool, called "Panel Editor," which provides a convenient way to produce custom designs for the physical operator panel interface and define its operation according to the particular application.

Figure 10:
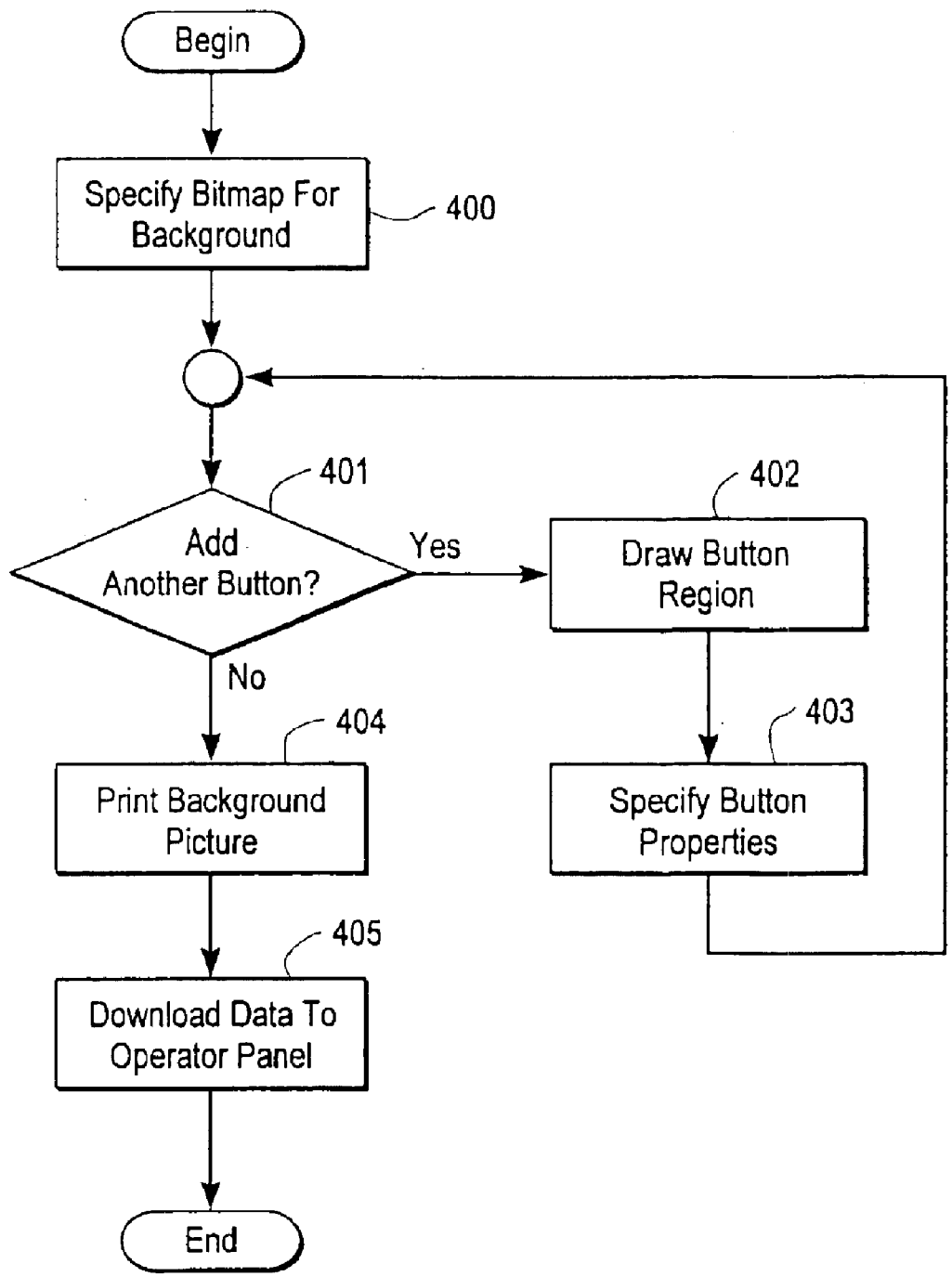
FIG. 10 is a general flowchart illustrating the process of using the software tool for designing and configuring the operator panel buttons, in accordance with another specific embodiment of the present invention.

FIG. 10 is a general flowchart illustrating the process of using this software tool for designing and configuring the operator panel buttons, in accordance with another specific embodiment of the present invention. The software tool is a graphical editor in which a picture (e.g., bitmap) is used to form the background graphics onto which a multiple regions are "drawn" forming the active areas, or buttons, of the operator panel. When completed, data describing the essential button information is downloaded to the operator panel electronic circuitry where it is stored in non-volatile memory. The picture background is then printed and inserted into the operator panel either through a housing slot or using a removable housing top.

According to the specific embodiment, a user can design an operator panel layout and button configuration using the general method of FIG. 10. In addition to the typical functions commonly found in modem software applications, such as the ability to save, load, and print files, etc., the preferred embodiment of the Panel Editor allows the user to load a bitmap file which serves as the background graphics for the operator panel interface in a step 400. At that point the user may choose to add a new button in a step 401. If the user decides to add a new button in step 401, then using the software tool the user draws a new button to a size and a position where desired over the bitmap in a step 402. In a step 403, the user then sets the specific parameters of the button such as the type of button, the pressure sensitivity of the button, and activation functions for the button. When the design is complete and the user determines no more buttons are to be added from step 401, the software tool prints the background picture in a step 404 and the printed representation is ready to be placed on the tactile sensor of the operating panel. The configured button data is downloaded in a step 405 to the operator panel which is connected to the computer running the Panel Editor tool via appropriate communication channels, such as a serial or other cable or wireless channel. The operator panel with the installed printed representation of its input buttons is then ready for use. The Panel Editor software tool will be described in more detail below.

Examples of the types of buttons that may be designed using the Panel Editor tool include toggle buttons for single operation, repeat buttons for continuous operation, one-dimensional buttons for one-dimensional positioning, and two-dimensional buttons for two-dimensional positioning.

Figure 11:
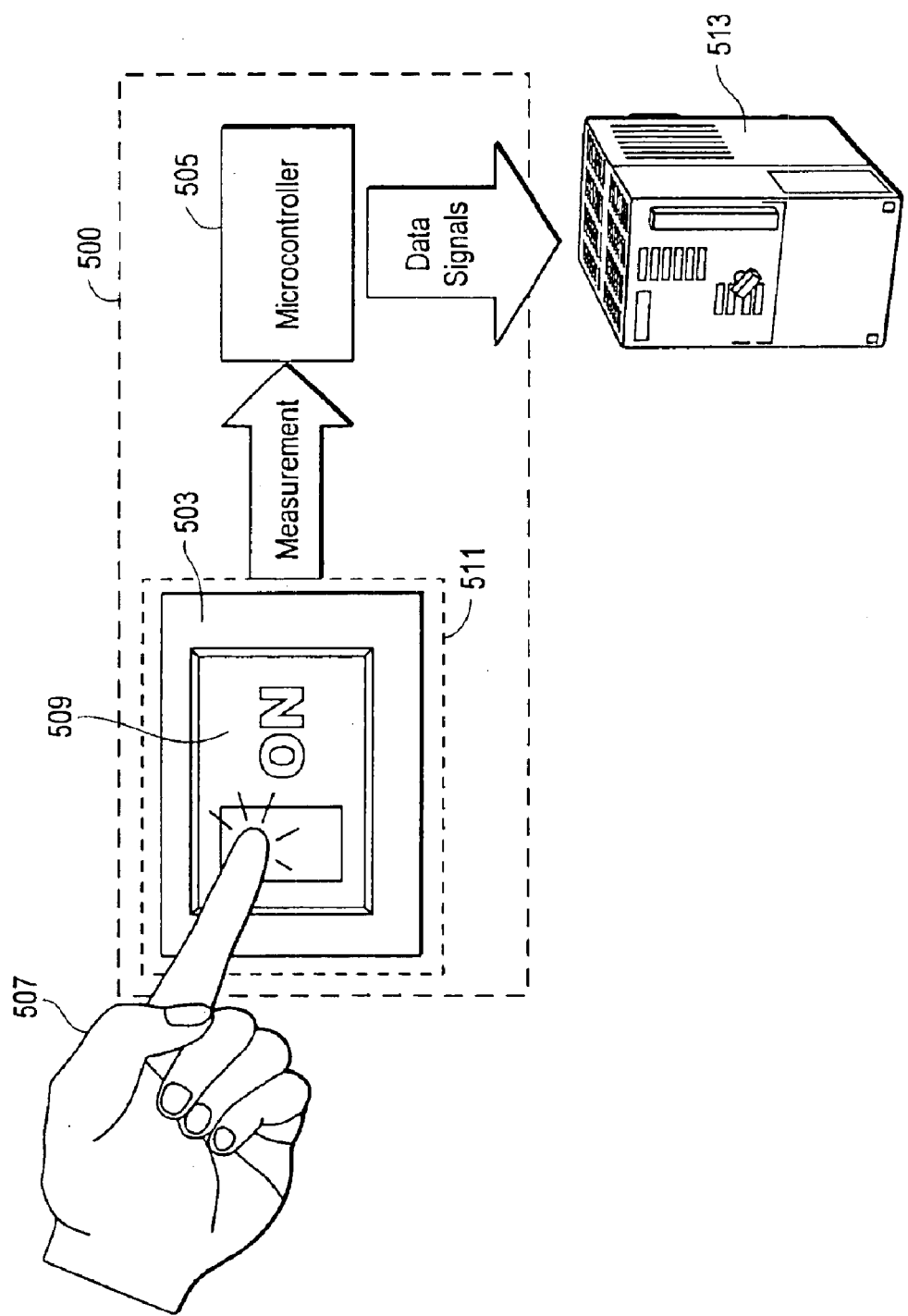
FIG. 11 is a diagram showing an example of an "on" button on a tactile sensor of the operating panel sending control signals to a PLC, according to a specific embodiment of the present invention.

In particular, a toggle button can be used to cause a single operation, such as can be used for "on" or "off" functions. For example, FIG. 11 is a diagram showing an example of an "on" button on a tactile sensor of the operating panel sending control signals to a computing device like a PLC, according to a specific embodiment of the present invention. The simplified representation of FIG. 11 shows operating panel 500 which includes a representation 503 having a toggle "on" button 509 that is placed on the tactile sensor 511, as well as a microcontroller 505. When a user 507 touches the button 509 the existence of a pressure and the location of the pressure are measured and the measured data is sent to microcontroller 505 which processes the measurements and sends appropriate data signals to the controlled device 513, such as a PLC, coupled to operator panel 500. In this example, the data signal sent to the PLC might be only a button identification indicating that it has been pressed and receiving the button identification information causes the PLC to perform a corresponding action, such as turning "on" some kind of machinery attached to the PLC.

In some specific embodiments such as described above for FIG. 9, a toggle button may additionally be pressure-sensitive or time-sensitive such that particular pre-defined functions can be activated depending on certain pre-defined pressure and/or time limits for a button being pressed. For example, a light and/or short-lived pressure might be assigned the function of providing a "help" function on a display; whereas a heavier pressure (or alternatively a longer-lived pressure) might be assigned the function of turning a controlled device "on" and any subsequent pressure on that same button might be assigned the "off" function.

Figure 12:
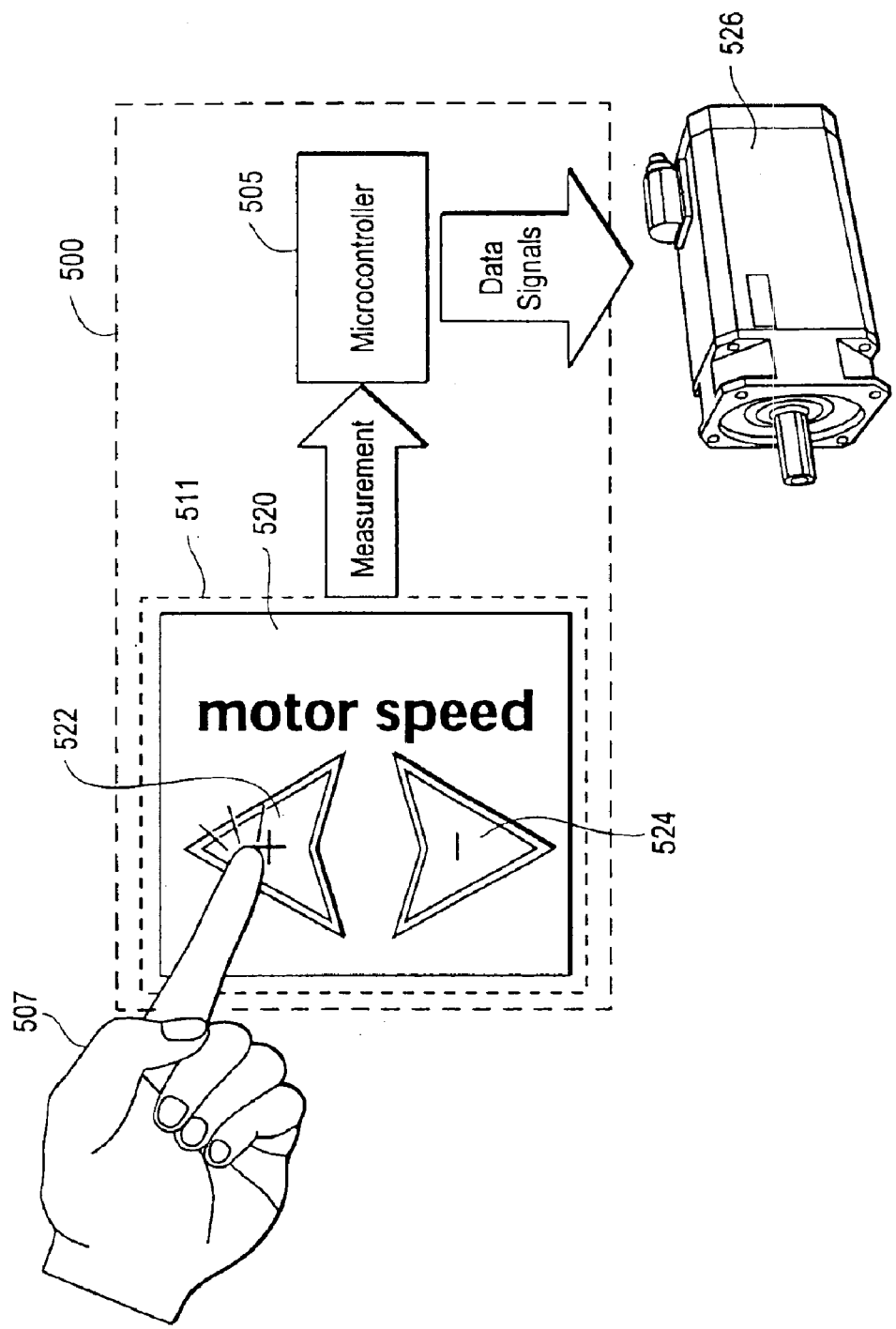
FIG. 12 is a diagram showing an example of pressure-sensitive "repeat" buttons on a tactile sensor of the operating panel sending control signals to motor control circuitry coupled to the operating panel, according to a specific embodiment of the present invention.

A "repeat" button providing continuous operation can be used to provide volume control, acceleration or speed control, or other such functions. FIG. 12 is a diagram showing an example of pressure-sensitive "repeat" buttons on a tactile sensor of the operating panel sending control signals to motor control circuitry coupled to the operating panel, according to a specific embodiment of the present invention. The simplified representation of FIG. 12 shows operating panel 500 which includes a representation 520 having an increase "repeat" button 522 and a decrease "repeat" button 524 that is placed on the tactile sensor 511, as well as a microcontroller 505. In this example, buttons 522 and 524 respectively control the increasing and decreasing speed of a motor that is attached to motor control circuitry 526 coupled to operating panel 500. When a user 507 touches the button 522 the existence of a pressure and the location of the pressure are measured and the measured data is sent to microcontroller 505, which processes the measurements and sends appropriate analog signals directly to the motor control circuitry 526. In this example, operator panel 500 runs in isolation mode, discussed previously.

One-dimensional buttons can provide one-dimensional positioning control based on certain defined parameters such as orientation (horizontal, vertical), minimum/maximum values (left/right, top/bottom), or other controls based on the relative position inside the button region. This type of button can be useful, for example, for a temperature setting control. Two-dimensional buttons can provide two-dimensional positioning control based on relative coordinate-based positioning inside the button region. For example, the two-dimensional button can have a variety of shapes and a touch on a particular part of the button can have differing functions according to the touch's location on the button. Additionally, pressure-sensitivity can be a supplemental part of determining the function associated with the location of the touch (e.g., different levels pressure in the same location within the button can correspond to different functions). These types of buttons, as well as other buttons discussed above are further described in conjunction with the following description of the Panel Editor software tool.

An example of the graphical user interface of the Panel Editor tool, according to a specific embodiment, is shown in FIG. 13a. The Panel Editor software can be provided on a floppy disk, a magnetic storage disk or tape, a CD-ROM, or a hard drive of a computer or a server or other computing device. FIG. 13a shows a graphical user interface window 600 of the Panel Editor. The window 600 includes a pull-down menu bar 602 and icons 604. Menu bar 602 and icons 604 are used to create the size, type, location of the buttons and to assign particular functions to the buttons created. In this example, a completed design 606 for a whirlpool control panel has been created by the user. The whirlpool control panel design 606 includes multiple rectangular push buttons 610 to select various types of music, triangular pressure sensitive buttons 612 and 614 for adjusting the volume of the music, a sliding temperature control button 616, two push buttons 618 and 620 for turning the whirlpool system on and off, and a circular three-variable pressure sensitive button 622 to control the bubble generator for the whirlpool tub.

Buttons 610 are toggle buttons that can each can be used to cause a single operation, such as can be used for turning "on" or "off" jazz music, rock music, country music, techno music, ambient music and hip-hop music. Therefore, a user by touching the appropriate one of buttons 610 can control the type of music played by the stereo system coupled to the whirlpool control panel. Triangular pressure-sensitive buttons 612 and 614 are "repeat" buttons for adjusting the volume of the selected music up or down. Sliding temperature control button 616 is an example of a one-dimensional button that can provide one-dimensional positioning control based on certain defined parameters. In this case, the button 616 provides a whirlpool temperature setting control for setting temperature between 72 and 115 degrees Fahrenheit. In particular, a touch on the left end of the button 616 is configured to cause the temperature to adjust to 72 degrees and a touch on the right end of the button 616 is configured to cause the temperature to adjust to 115 degrees. Button 616 is also configured so that a touch located intermediate between the ends will cause the temperature to adjust to a temperature approximately proportional to the temperature of one of the ends relative to its location from that end. For example, a touch on the center of the button 616 would cause the temperature to adjust to about 99 degrees; whereas, a touch near the "T" in "Temperature" would cause the temperature to adjust to about 88 degrees and a touch near the "re" in "Temperature" would cause the temperature to adjust to about 110 degrees. Push button 618 is a toggle button that can cause the whirlpool system to turn "on", and push button 620 is a toggle button that can cause the whirlpool system to turn "off". Circular three-variable pressure-sensitive button 622 is an example of a two-dimensional button that can provide two-dimensional positioning control based on relative coordinate-based positioning inside the button region. In this example, button 622 is configured so that a touch in the region 624 can cause small bubbles, in the region 626 can cause a few bubbles, in the region 628 can cause big bubbles, and in the region 630 can cause many bubbles. Button 622 is configured so that touches in intermediate areas between regions produces different results: a touch between regions 630 and 628 would cause many big bubbles, a touch between regions 628 and 626 would cause a few big bubbles, a touch between regions 624 and 630 would cause many small bubbles, a touch between regions 622 and 624 would cause a few small bubbles, and a touch in the center between all regions would cause a medium amount of medium-sized bubbles.

FIG. 13b shows an example of the picture background representation 650 of the operator panel buttons as configured by the user using the Panel Editor tool, according to the specific embodiment of FIG. 13a. Representation 650 can be a printout of the buttons configured using graphical user interface window 600 of FIG. 13a. FIG. 13c shows an example of the virtual button regions of the tactile sensor of the whirlpool operating panel that corresponds to the picture background representation of the operator panel buttons configured by the user using the Panel Editor tool, according to the specific embodiment of FIG. 13a and FIG. 13b. That is, button regions 660 correspond to the configured music selection buttons 610, button regions 662 and 664 correspond to the configured volume buttons 612 and 614, button region 666 corresponds to the configured temperature control button 616, button regions 668 and 670 correspond to the configured "on" and "off" buttons 618 and 620, and button region 672 corresponds to the configured bubble control button 622.

Figure 14:
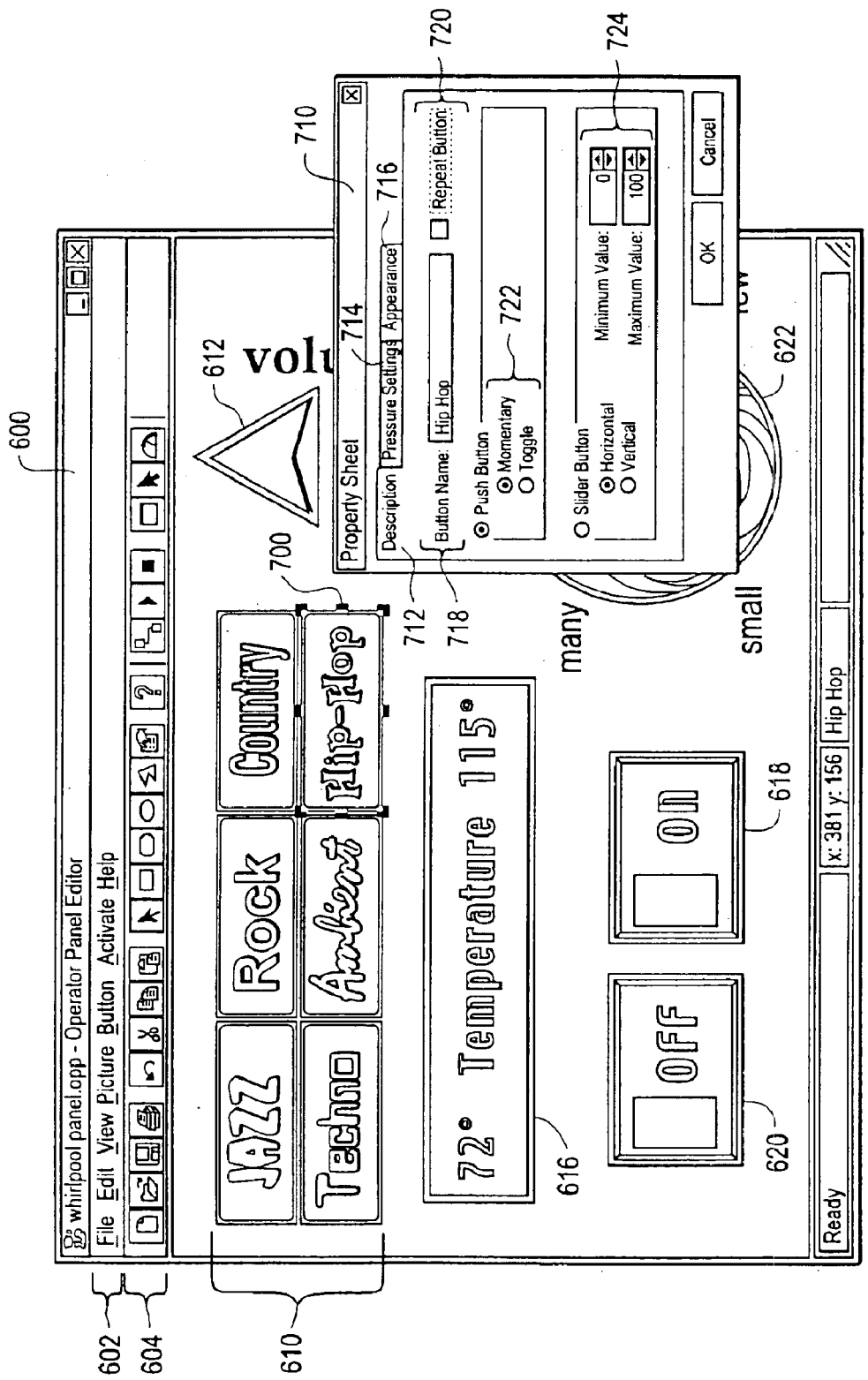
FIG. 14 shows the Panel Editor tool of FIG. 13a where one of the buttons is currently selected and its corresponding Property Sheet window is opened so that the user is able to set the selected button's parameters, according to the specific embodiment.

According to the specific embodiment, FIG. 14 shows the Panel Editor tool of FIG. 13a where one of the buttons is currently selected and its corresponding Property Sheet window is opened so that the user is able to set the selected button's parameters. The button's parameters include, but are not limited to, button type, pressure sensitivity settings, and activation functions. In the Panel Editor graphical user interface window 600, when a button, such as the hip-hop music selection button 700 is selected, the selected button's Property Sheet window 710 is opened. From window 710, the user may select on the Description tab 712, the Pressure Settings tab 714, or the Appearance tab 716. Selecting the Description tab 712 allows the user to define: the button's description in terms of the button name in box 718, whether the button is to be a "repeat" button by selecting box 720, whether the button is to be a push button (and if so, a momentary push button or a toggle button) in selection circles 722, and whether the button is to be a slider button (and if so, whether the sliding is to be horizontal or vertical and what the maximum and minimum values should be). Selecting the Pressure Settings tab 714 allows the user to define whether the selected button should have different functions or levels associated with certain definable pressure levels; and selecting the Appearance tab 716 allows the user to define the physical shape, appearance, orientation, and location of the button. In other specific embodiments where the different lengths of time that a touch exerts pressure on a certain button can determine different functions, a tab for Time Settings can be provided to allow the user to define whether the selected button should have different functions associated with certain definable time lengths.

It is understood that the example provided with FIGS. 13 and 14 of an operator control panel for a whirlpool system situated outdoors is merely an example, and that the reconfigurable operator control panel is useful in any industrial settings or other environmentally harsh environments. The controlled device can be, for example, a motor controller, a temperature controller, a PLC, a computer, a sensor, a pressurizer, a laser, a furnace, a whirlpool, or a mechanical manipulation device, etc.

Once the design is completed using the Panel Editor tool, the user can print out representation 650 (FIG. 13b) of the operating control panel, place the representation onto the tactile sensor of the panel, and then use the software tool to download and store the configured parameters and functions of the buttons for the representation into the memory of the operating control panel electronics. The operating panel then is disconnectable from the computer running the software tool, and can be coupled to the controlled device(s) so as to control the device according to the user's operation of the desired buttons for the particular application. When the particular application changes (e.g., a particular controlled device is upgraded or has a replacement, or another device is added or deleted, the type of control needs to be altered), the operating control panel can simply be disconnected and loaded up with the latest version of the representation having the associated button parameters and button functions that are reconfigured by the user as appropriate to the changed needs. The reconfiguration can include changing the size, type, locations, shapes, functions, pressure-sensitivity, time-sensitivity, etc. of the various buttons on the representation and the associated virtual button regions of the operating panel's tactile sensor.

What is claimed:

1. A control panel apparatus having reconfigurable input buttons, said apparatus comprising:
   a tactile sensor;
   a plurality of input buttons reconfigurable by a user, a representation of said plurality of input buttons placed on said tactile sensor; and
   electronics, coupled to said tactile sensor, for measuring a location of a touch to an input button on said tactile sensor and an existence of and a level of pressure of said touch and for storing a plurality of functions, each of said plurality of functions associated with a corresponding one of said plurality of input buttons and each of said plurality of functions associated with a different level of pressure of said touch;
   wherein said touch on one of said plurality of input buttons on said tactile sensor causes said electronics to measure said location and said level of pressure of said touch and said touch causes an occurrence of one of said plurality of functions associated with said location and said level of said pressure of said touch.

2. The apparatus of claim 1, wherein the number of said plurality of input buttons can be reconfigured by the user.

3. The apparatus of claim 1, wherein the spatial relation between said plurality of input buttons can be reconfigured by the user.

4. The apparatus of claim 1, wherein the shapes of said plurality of input buttons can be reconfigured by the user.

5. The apparatus of claim 1, wherein the sizes of said plurality of input buttons can be reconfigured by the user.

6. The apparatus of claim 1, wherein the locations of said plurality of input buttons can be reconfigured.

7. The apparatus of claim 1, wherein the orientations of said plurality of input buttons can be reconfigured by the user.

8. The apparatus of claim 1, wherein the functions associated with each of said plurality of input buttons can be reconfigured by the user.

9. The apparatus of claim 8, wherein the functions associated with each of said plurality of input buttons and with defined levels of pressure can be reconfigured by the user.

10. The apparatus of claim 9, wherein said functions include providing help, turning on, turning off, increasing, decreasing, and particular actions depending on said defined levels of pressure.

11. The apparatus of claim 9, wherein said functions include providing help, turning on, turning off, increasing, decreasing, particular actions depending on said defined levels of pressure, and providing particular actions depending on lengths of time that a defined level of pressure is exerted on said location.

12. The apparatus of claim 1, further comprising:
   a housing for enclosing said electronics and said tactile sensor, said housing including a slot for inserting said representation of said plurality of input buttons onto said tactile sensor.

13. The apparatus of claim 1, further comprising:
   a housing for enclosing said electronics and said tactile sensor, said housing including a top, said top being removable to place said representation of said plurality of input buttons onto said tactile sensor.

14. The apparatus of claim 1 wherein said tactile sensor comprises a conductive foam elastomer.

15. A method of configuring an operating control device having a foam tactile sensor, said method comprising the steps of:

(a) defining an input button and a location of said input button corresponding to a portion of said tactile sensor, wherein said input button and said location of said input can be reconfigurable by a user of said operating control device;

(b) defining a first function of said input button, said first function associated with an existence of, a first defined level of pressure of, and a location of a touch within said portion on said tactile sensor; and (c) defining a second function of said input button, said second function associated with an existence of, a second defined level of pressure of, and said location of a touch within said portion on said tactile sensor; wherein said first function of said input button is selectable based on said first defined level of pressure and said second function of said input button is selectable based on said second defined level of pressure.

16. The method of claim 15, further comprising the steps of:

establishing a first configuration resulting from said steps (a) to (c);

generating a first representation of said input button for placement over the tactile sensor within said wherein operating control device; and loading said first configuration into said operating control device to enable said operating control device to determine an appropriate output dependent on said first or second defined level of pressure at said location of said touch.

17. The method of claim 16, further comprising the steps of:

changing said first function or said second function of said input button to result in a different output;

establishing a second configuration resulting from said changing step;

loading said second configuration into said operating control device to enable said operating control device to determine a different appropriate output.

18. The method of claim 15, wherein said input button defining step includes defining the type of said input button.

19. The method of claim 15, wherein said type of said input button can comprise a toggle button, a pressure-sensitive button, a time-sensitive button, a one-dimensional control button, a two-dimensional control button, or a repeat button.

20. The method of claim 15, wherein said operating control device controls an external device coupled to said operating control device, and said operating control device and said external device are in a harsh environment or in an industrial setting.

21. A computer program product for configuring an operator control panel having a tactile sensor, said computer program product comprising:

computer code for defining an input button and a location of said input button corresponding to a portion of said tactile sensor, wherein said input button and said location of said input button can be reconfigurable by a user of said operator control panel;

computer code for defining a first function of said input button, said first function associated with an existence of, a first defined level of pressure of, and a location of a touch within said portion on said tactile sensor; and computer code for defining a second function of said input button, said second function associated with an existence of, a second defined level of pressure of, and said location of a touch within said portion on said tactile sensor; and a computer-readable medium for storing said computer codes;

and wherein said first function of said input button is selectable based on said first defined level of pressure and said second function of said input button is selectable based on said second defined level of pressure.

22. The computer program product of claim 21 wherein:

said computer-readable medium comprises a floppy disk, a magnetic storage disk or tape, a CD-ROM, or a hard drive.

23. The computer program product of claim 21 wherein:

said computer code for defining said input button provides a user to configure said input button as a toggle button, a pressure-sensitive button, a time-sensitive button, a one-dimensional control button, a two-dimensional control button, or a repeat button.

24. A system for controlling devices in an industrial or harsh environment, said system comprising:

an operating control panel having a foam tactile sensor, a representation of input buttons on said foam tactile sensor, and electronics, wherein said electronics me capable of measuring a pressure level and a location from a touch on said representation of input buttons on said foam tactile sensor, processing said pressure level and said location, and outputting a signal that causes a function associated with said pressure level and said location, wherein said input buttons and said function associated with said pressure level and said location are reconfigurable by a user of said operating control panel; and an external device coupled to said operating control panel for receiving said signal and performing said function.

25. The system of claim 24, further comprising software for reconfiguring said input buttons on said representation of said operating control panel and loading said reconfigured input buttons and associated functions to said operating control panel, wherein said electronics are capable storing said reconfigured input buttons and associated functions so as to cause said external device coupled to said operating control panel to perform according to the reconfigured input buttons.

26. The system of claim 24, wherein said external device includes a motor controller, a temperature controller, a PLC, a computer, a sensor, a pressurizer, a laser, a furnace, a whirlpool, or a mechanical manipulation device.

27. A control panel apparatus having reconfigurable input buttons, said apparatus comprising:

a tactile sensor;

a plurality of input buttons reconfigurable by a user, a representation of said plurality of input buttons placed on said tactile sensor; and electronics, coupled to said tactile sensor, for measuring a location of a touch to an input button and for storing a plurality of functions, each of said plurality of functions associated with a corresponding one of said plurality of input buttons;

wherein said touch on one of said plurality of input buttons causes said electronics to measure said location of said touch and said touch causes an occurrence of one of said plurality of functions associated with said location of said touch; and wherein at least one of said functions and at least one of the number, spatial relation, shapes, sizes, orientations and/or locations of said plurality of input buttons can be reconfigured by the user.

28. The apparatus of claim 27 wherein said tactile sensor comprises polyester and conductive layers.

29. A method of configuring an operating control device having a tactile sensor, said method comprising the steps of:

defining a plurality of input buttons and a plurality of corresponding locations of said input buttons corresponding to portions of said tactile sensor;

defining a first set of functions of said plurality of input buttons, said first set of functions triggered by a touch on said tactile sensor at portions corresponding to said plurality of corresponding locations of said input buttons to form a first configuration; and generating a first representation of said plurality of input buttons for placement over the tactile sensor within said operation control device; and loading said first configuration into said operation control device to enable said operation control device to determine an appropriate output dependent on a location of said touch on said first representation on said tactile sensor;

changing said first configuration to establish a second configuration, wherein said second configuration differs from said configuration by at least one of said functions and at least one of the number, spatial relation, shape, size, orientations and/or locations of said plurality of input buttons being reconfigured by the user; and loading said second configuration into said operation control device to enable said operating control device to operate according to said second configuration.

30. The method of claim 29, wherein said tactile sensor of said operating control device comprises polyester and conductive layers.

31. A computer program product for configuring an operator control panel having a tactile sensor, said computer program product comprising:

computer code for defining an input button and a location of said input button corresponding to a portion of said tactile sensor;

computer code for defining at least one of a function, size, orientation, location, spatial relation, and/or shape of said input button to form a first configuration; and computer code for altering at least one of said function and at least one of said size, orientation, location, spatial relation, and/or shape of said input button from said first configuration to form a second configuration; and a computer-readable medium for storing said computer codes.

* * * * *